May 28, 1935.  H. J. HICKEY  2,002,663
INTERNAL COMBUSTION ENGINE
Original Filed Aug. 12, 1930  4 Sheets-Sheet 1
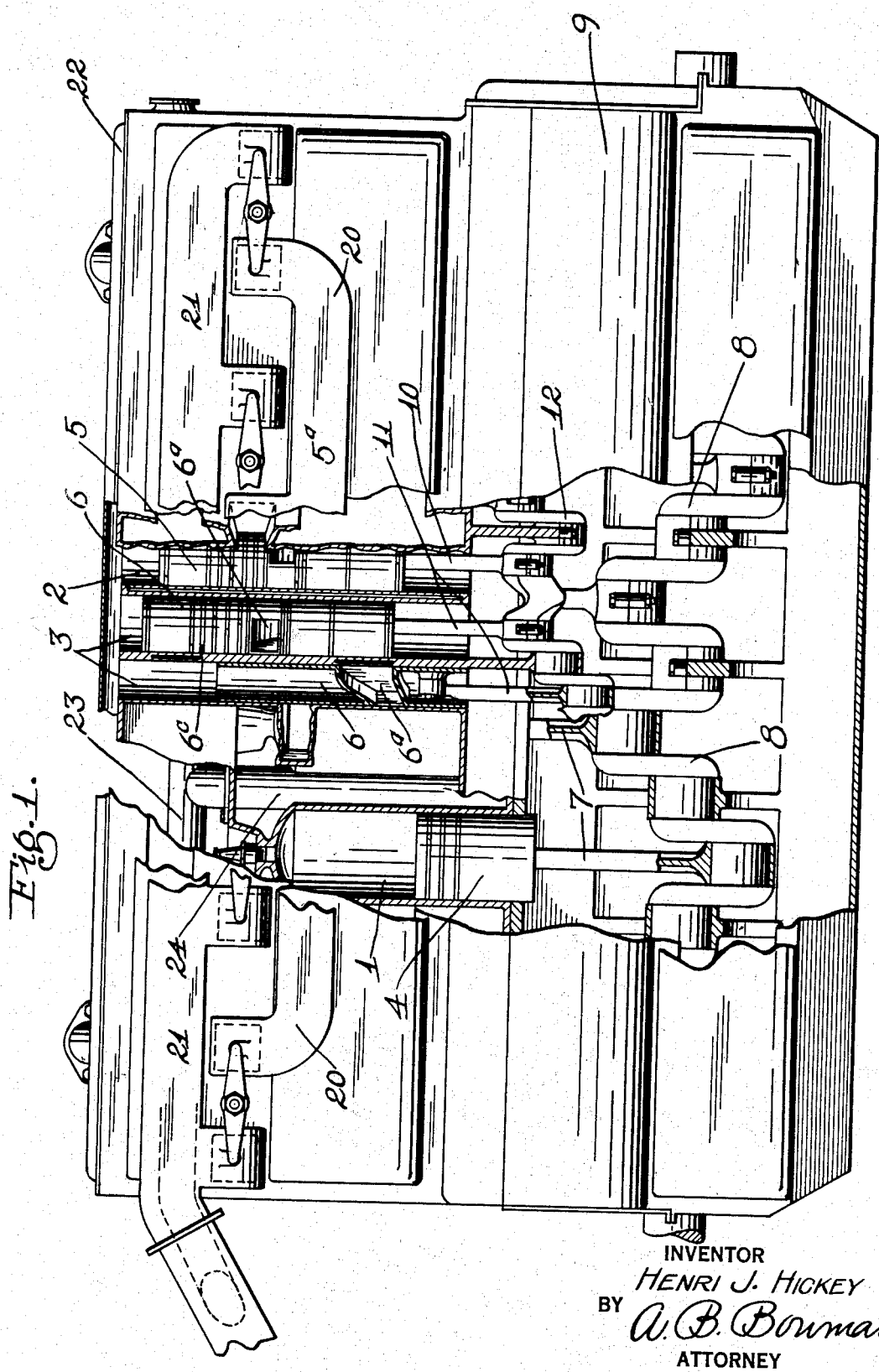
INVENTOR
HENRI J. HICKEY
BY A. B. Bowman
ATTORNEY

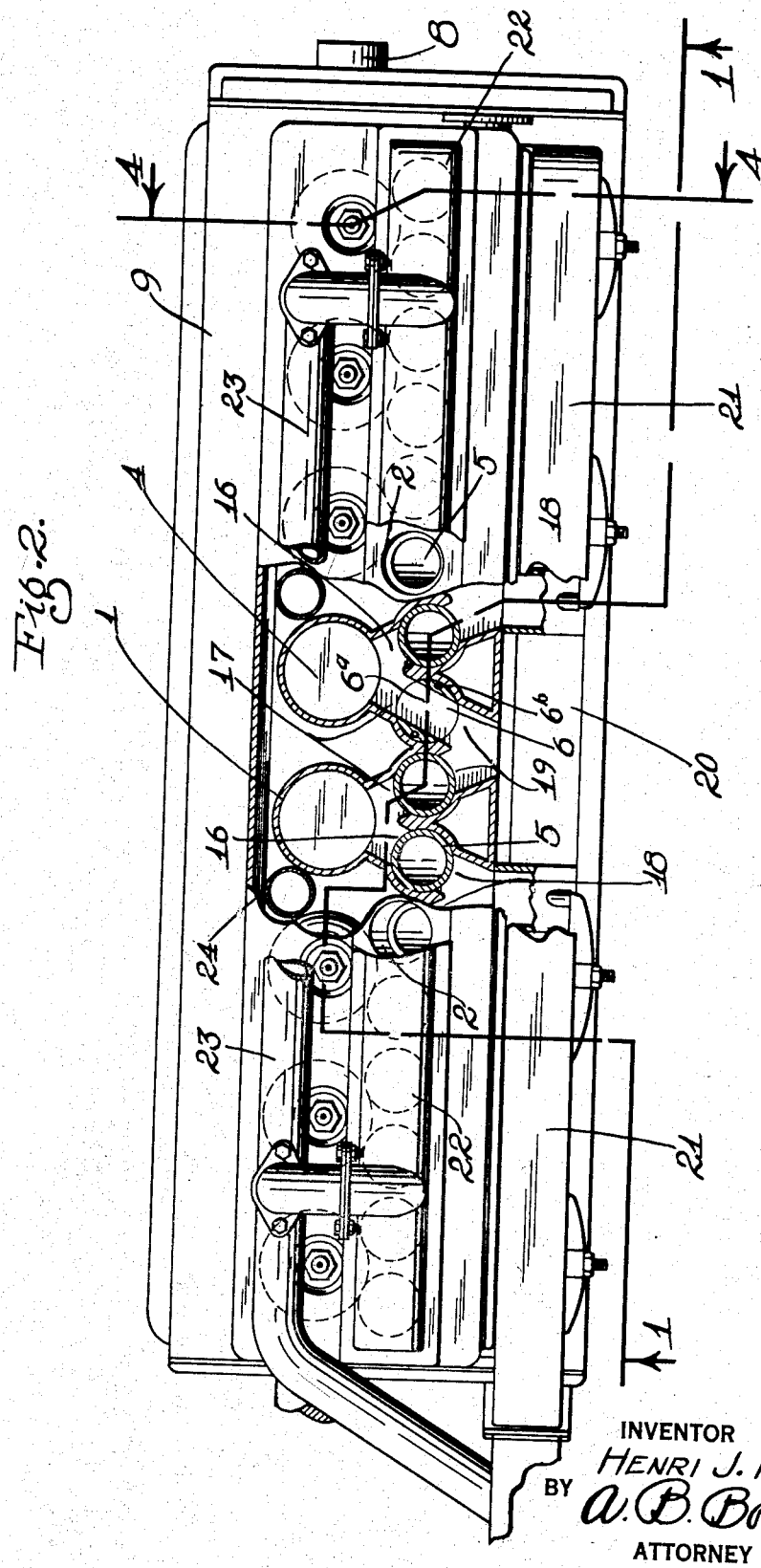

May 28, 1935.  H. J. HICKEY  2,002,663
INTERNAL COMBUSTION ENGINE
Original Filed Aug. 12, 1930  4 Sheets-Sheet 3
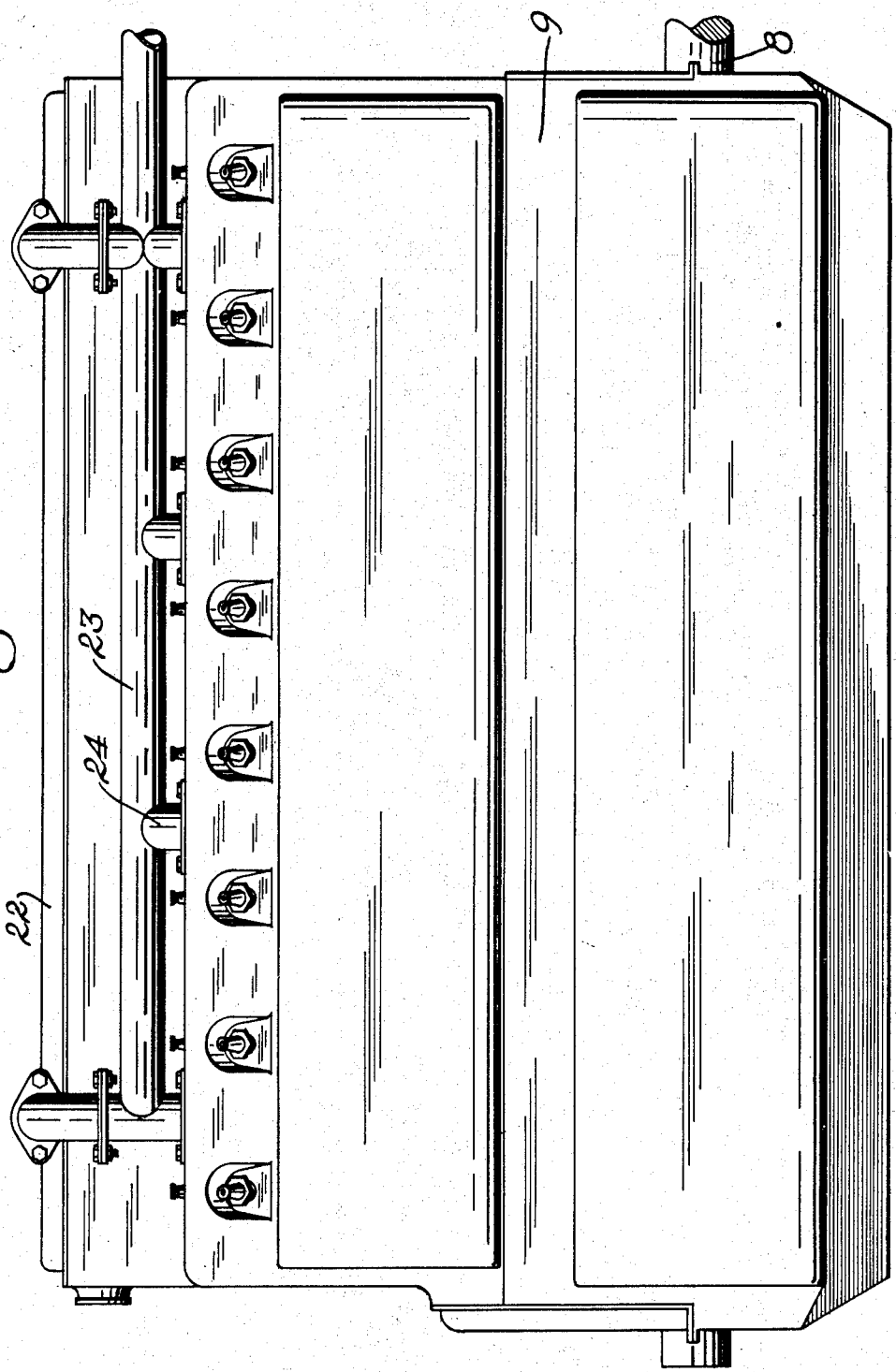
INVENTOR
*Henri J. Hickey*
BY *A. B. Bowman*
ATTORNEY May 28, 1935.  H. J. HICKEY  2,002,663
INTERNAL COMBUSTION ENGINE
Original Filed Aug. 12, 1930  4 Sheets-Sheet 4
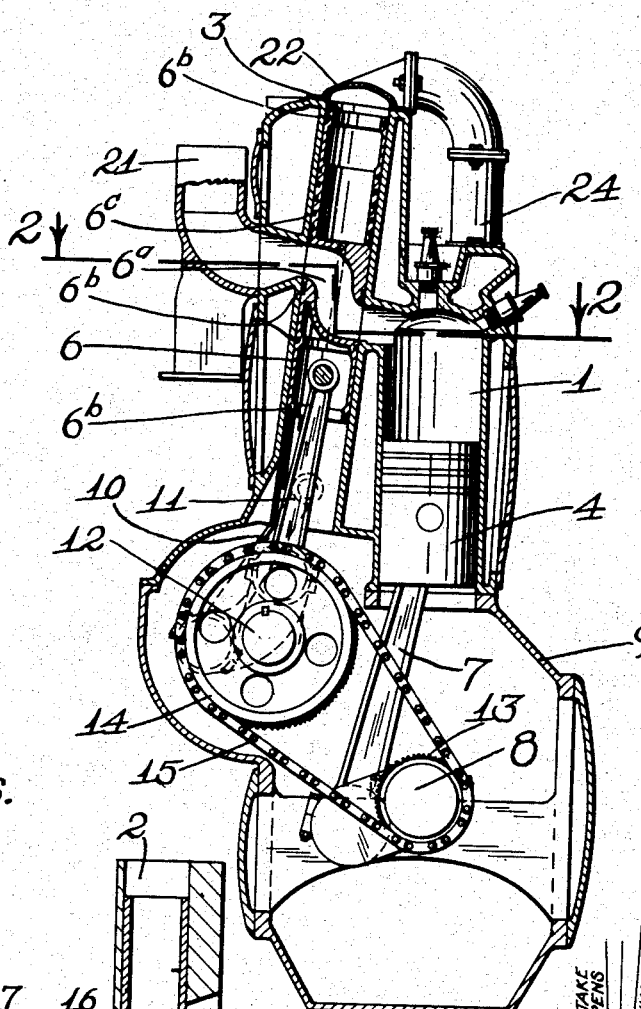
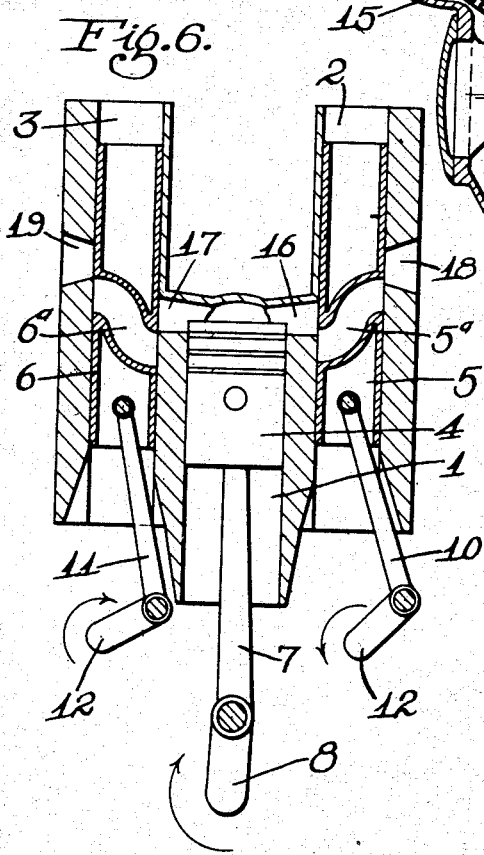
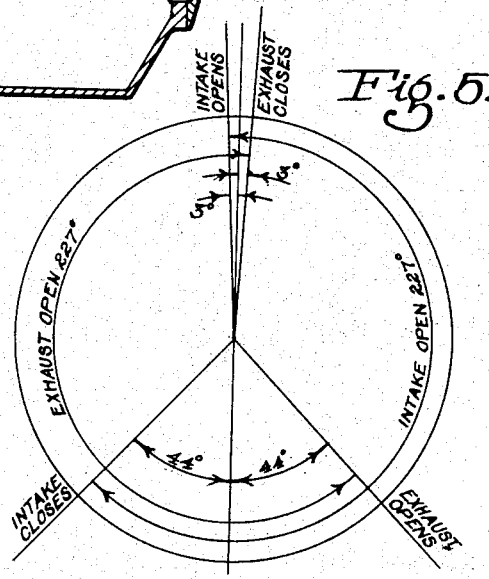
INVENTOR
HENRI J. HICKEY
BY A. B. Bowman
ATTORNEY Patented May 28, 1935

2,002,663

UNITED STATES PATENT OFFICE 2,002,663

INTERNAL COMBUSTION ENGINE

Henri J. Hickey, Los Angeles, Calif.

Application August 12, 1930, Serial No. 474,688
Renewed October 29, 1934

9 Claims. (Cl. 123—188)

My present invention relates to internal combustion engines, and more particularly to such engines having piston type valves, and applicable to two and four cycle gasoline and Diesel engines.

An object of this invention is: first, to provide an internal combustion engine having a novel piston type valve construction whereby a large and sustained valve opening may be had for the free and ready intake of fuel gases or air and for the scavenging of exhaust gases with a minimum of resistance, for producing a very efficient engine of this type; second, to provide an engine of this class in which the fuel gases or air are admitted to, and the exhaust gases are discharged from, the combustion cylinder through the same port in the wall of the combustion cylinder, whereby the fuel gases or air are partially preheated and the walls of the port partially cooled; third, to provide an engine of this class in which the cylinders are positioned in alinement and in which the intake and exhaust manifolds are connected to each of two adjacently positioned combustion cylinders through one intake port and one exhaust port, for simplifying the engine construction and for direct passage of gases to and from the combustion cylinders; fourth, to provide a novelly constructed piston type valve having a transverse port therethrough for connecting the intake and exhaust manifolds to the combustion cylinder, which port in the valve piston is constructed in gradual and sweeping curves, and which port terminates at its ends normal to the opposite side walls of the pistons and in alinement with the ports and passages connected to the intake and exhaust manifolds and to the combustion cylinder, for reducing to a minimum the resistance to the passage of gases through the ports of the valve pistons; fifth, to provide an engine with piston type valves in which the extended or upper ends of the piston valve cylinders are inter-connected for equallizing the pressures at the extended or upper ends of such cylinders when the valve pistons are reciprocated, for reducing to a minimum the effort required to reciprocate such pistons, and to provide such an engine in which the upper ends of the pistons are open for increasing the space at the upper ends of the valve cylinders, and thereby still further reducing to a minimum the resistance to the free reciprocation of the valve pistons; sixth, to provide an engine of this class in which the upper ends of the valve pistons are connected, together with the crank case of the engine, to the exhaust pipe of the engine for exhausting the oil vapors in the valve cylinders and in the crank case, to the atmosphere; seventh, to provide novel, simple, and economical means for condensing oil vapors from the crank case; eighth, to provide a novelly constructed piston type valve in which the wear and piston slap is reduced to a minimum and whereby the same is permitted to expand and to be distorted considerably without binding; and ninth, to provide as a whole a novelly constructed engine of this class and one which is simple and economical in construction, durable, efficient, and which will not readily deteriorate or get out of order.

With these and other objects in view, as will appear hereinafter, my invention also includes certain novel features of construction, combination and arrangement of parts and portions as will be hereinafter described in detail and particularly set forth in the appended claims, reference being had to the accompanying drawings and to the character of reference thereon, which form a part of this application, in which:

Fig. 1 is a partial side elevational and partial sectional view of my engine in one form of construction, with the view taken from the valve side of the engine and on the line 1—1 of Fig. 2; Fig. 2 is a partial plan and partial sectional view thereof taken on the line 2—2 of Fig. 1; Fig. 3 is another side elevational view of my engine taken from the opposite side thereof; Fig. 4 is a transverse sectional elevational view thereof taken through 4—4 of Fig. 2; Fig. 5 is a valve timing diagram of my engine; and Fig. 6 is a developed diagrammatic sectional elevational view of my engine in one form, showing the relative positions of the valve pistons to each other and to the working piston at the beginning of the intake stroke of the working piston in the combustion cylinder.

Like characters of reference refer to similar parts and portions throughout the several views of the drawings.

The combustion or working cylinders 1, the intake valve cylinders 2, and the exhaust valve cylinders 3, of the engine illustrated in the drawings, are cast in a single block, but it is obvious that the cylinders may be separate members suitably connected together. There is provided one intake valve cylinder and one exhaust valve cylinder for each combustion cylinder. In each combustion cylinder 1 there is reciprocally mounted a conventional piston 4, while in the intake and exhaust valve cylinders 2 and 3 there are reciprocally mounted, respectively, intake and exhaust valve pistons 5 and 6 of special construction, as will be hereinafter specifically described. The working piston 4 is connected by a connecting rod 7 to a crank shaft 8, which is a main crank shaft of the engine and is rotatably mounted in the crank case 9 on which the cylinders or engine blocks are mounted.

The intake and exhaust valve pistons are of identical construction and are in the form of long cylinders which are connected at their lower ends, by connecting rods 10 and 11, to a valve operating crank shaft 12. The crank shaft 12 is operated in this instance, at one-half engine speed, preferably by sprockets 13 and 14 connected respectively to the crank shafts 8 and 12, and by a sprocket chain 15, as shown in Fig. 4.

The crank shaft 12 is also rotatably mounted in the crank case but considerably above and to one side of the main crank shaft 8. Such mounting of the valve operating crank shaft necessitates the positioning of the axis of the valve operating crank shaft considerably to one side of the combustion cylinder 1. It is desirable, however, that the valve cylinders be positioned as closely as possible to the combustion cylinders so as to reduce the length of the passages, connecting the cylinders to each other, for the admission and exhausting of gases. The valve cylinders, which are positioned adjacent and parallel to each other and at one side of the combustion cylinder which they serve, are inclined at an angle to the longitudinal axis of the combustion cylinder, as shown best in Fig. 4.

The intake and exhaust valve cylinders 2 and 3 are connected intermediate their ends, and on the sides thereof adjacent the combustion cylinder, by passages 16 and 17, with the upper end of the combustion cylinder 1. Said passages 16 and 17 terminate in the wall of the combustion cylinder in a wide unitary port or opening as shown best in Fig. 2. By such relation of intake and exhaust passages, the fuel gases are preheated as they enter the combustion cylinder, and the walls of the passages are also cooled by said fuel gases.

The opposite sides of the valve cylinders from the intake and exhaust passages just described, are connected by relatively wide ports 18 and 19, respectively, to the intake and exhaust manifolds 20 and 21, as shown in Figs. 1, 2 and 4. It will be here noted that there is provided in the engine shown only a one intake port 18 and a one exhaust port 19 for each pair of adjacently positioned combustion cylinders, as shown in Fig. 2. But the same two intake and exhaust ports do not serve the same pair of adjacently positioned cylinders; one intake port 18 serves one pair of combustion cylinders, while only one of such combustion cylinders is served by an exhaust port which also serves a combustion cylinder which is not of the aforementioned pair. Thus the intake and exhaust ports are arranged alternately along the side of the engine block. Such arrangement of ports provides simplicity and economy in construction of the engine block as well as of the intake and exhaust manifolds. By such arrangement of ports there is also provided a more direct passage of the fuel gases from the intake manifold to the combustion cylinders, and also a more direct passage of the exhaust gases from the combustion cylinders to the exhaust manifold.

The engine herein shown is substantially an L-head type of engine, since the valve cylinders are both at one side of the combustion cylinders. It will be noted, however, that the intake and exhaust valve cylinders may be positioned at opposite sides of the combustion cylinders and the piston valves mounted therein may be reciprocated by separate crank shafts, as shown in the diagrammatic view in Fig. 6. The latter arrangement forms substantially a T-head type of engine.

The valve pistons are relatively long and are of such length that the aforementioned ports and passages are covered by the valve pistons during the desired period, during the reciprocation of the valve pistons, to prevent the passage of gases. These valve pistons are provided intermediate their ends with substantially transverse ports 5a and 6a, respectively, which ports extend from the outer to the inner sides thereof and are adapted to connect, at predetermined periods, the ports and passages aforementioned. These ports 5a and 6a are inclined downwardly from the outer sides of the valve pistons to provide a substantial down draft for the fuel gases as they enter the combustion cylinder. Each of the ports is in the form of an ogee curve, with gradual or sweeping curves, which terminate at the ends of the ports in directions substantially normal to the cylindrical walls of the valve pistons, so as to avoid sharp edges at the juncture of the walls of the ports therein and the walls of the pistons, and to provide smooth passages for the flow of gases directly from and into the ports and passages, extending from the valve cylinders.

The ports 5a and 6a are positioned at substantially the middle portion intermediate the ends of the valve pistons. The portion of the valve pistons between the ports therein and the outer ends thereof close off the connection between the ports and passages connected to the valve cylinders when the valve pistons are in their inner or receded positions. At the opposite ends of the valve pistons and also at the opposite sides of the ports therein are provided rings, as indicated by 6b in Fig. 4, for sealing the space between the valve pistons and valve cylinders at the portions mentioned. But outwardly from the ports, there are provided a plurality of closely positioned rings, indicated by 6c in Fig. 4. These latter rings are positioned opposite the passages 16 and 17 and inwardly and outwardly thereof when the valve pistons are in their lowermost positions during the compression and power strokes of the working pistons, to provide an effective seal against the escape of the compressed and exploded gases.

In order to provide free reciprocation of the valve pistons and to permit considerable expansion thereof, and also to prevent wear and piston slap I have provided only slight clearance between the inner and outer ends of said pistons and the walls of the valve cylinders, namely, about 0.0025 of an inch; and considerable clearance intermediate the ends, from the portion immediately inwardly from the ports 5a and 6a to the portion immediately inwardly from the last of the closely positioned rings, indicated by 6c, the latter clearance being approximately 0.011 of an inch.

On the upper side of the engine block is secured a manifold 22, which is positioned over, covers and connects the upper ends of all of the valve cylinders, whereby the pressure in each of the valve cylinders, above the piston valves therein, is equalized, as the valve pistons are reciprocated, thus reducing to a minimum the resistance to the reciprocation of the valve pistons. The upper ends of the valve pistons are open so as to enlarge the space at the upper ends of the valve cylinders, thus, further reducing the resistance to the reciprocation, by reducing the compression and vacuum at the upper ends of the valve cylinders as the valve pistons are reciprocated. Any oil running into the cup shaped portions at the upper ends of the valve pistons is permitted to drain into the crank case of the engine through small oil holes 6b arranged between the side walls of the ports of the valve pistons and the adjacent side walls of the pistons, as shown in Fig. 2.

The manifold 22 is connected near its opposite ends to a conductor 23 which is in turn connected to the exhaust manifold 21, as shown in Figs. 1 and 2. To the conductor 23 are also connected a plurality of breather pipes 24, which extend upwardly from the crank case through the water jacket of the engine block, as shown in Figures 1, 2 and 3. The purpose of such connection of the manifold 22 and the crank case to the exhaust pipe is for exhausting the oil vapors of such portions of the engines, and to prevent deterioration of the oil in the crank case and also carbonizing of oil in the valve cylinders. It will be here noted that the condensable oil vapors are condensed in the cooled breather pipes and are allowed to run back into the crank case.

The operation, cycles and timing of my engine are as follows:

The intake opens, in this instance, as illustrated in the timing diagram in Fig. 5, three degrees before the crank shaft has reached top dead center, and remains open during an angular travel of 227 degrees of the crank shaft, that is 44 degrees past bottom dead center. This intake opening is effected by the raising of the intake valve piston 5, until the port 5a, therein, registers with the intake passage 16, and the intake port 18, such registry continuing until the intake valve piston 5 has receded to a point at which the port 5a is out of registry with the passage 16 and port 18. The diagram in Fig. 6 shows this port in valve piston 5 as just beginning to connect such a port and passage. The compression and power strokes of the cycle, are substantially the same as in the conventional piston type internal combustion engine, except that in my engine the valves continue their reciprocal movement. The exhaust valve opens during the latter part of the power stroke, namely, when the crank pin of the particular piston is 44 degrees before bottom dead center, and remains open for an angular travel of 227 degrees of the crank shaft, that is, until the crank pin has passed three degrees beyond top dead center, as shown in Fig. 5. The exhaust valve opening is effected in the same manner as described in connection with the intake opening, namely, by the registry of the port 6a in the exhaust valve piston 6, with the exhaust passage 17 and the exhaust port 19. Fig. 6 shows the exhaust opening as just closing, and the intake as just opening. In the arrangement of the intake and exhaust valve pistons, the crank pin actuating the exhaust valve piston, is 107 degrees ahead of the intake crank pin.

Though I have shown and described a particular construction, combination and arrangement of parts and portions of my internal combustion engine, and a particular application thereof to the L-head type of four cycle gasoline engine, I do not wish to be limited to this particular construction, combination and arrangement of parts and portions, nor to the particular application disclosed, but desire to include within the scope of my invention the construction, combination and arrangement of parts, portions and elements, substantially as set forth in the claims.

Having thus described my invention, what I claim as new and desire to secure by Letters Patent, is:

1. In an internal combustion engine, a combustion cylinder, an intake valve cylinder, an exhaust valve cylinder, said valve cylinders being arranged adjacent each other and adjacent the combustion cylinder, said valve cylinders being connected by intake and exhaust passages to the combustion cylinder, a working piston reciprocally mounted in the combustion cylinder, valve pistons reciprocally mounted in the valve cylinders, and a manifold connecting the outer ends of all of the valve cylinders.

2. In an internal combustion engine, a combustion cylinder, an intake valve cylinder, an exhaust valve cylinder, said valve cylinders being arranged adjacent each other and adjacent the combustion cylinder, said valve cylinders being connected by intake and exhaust passages to the combustion cylinder, a working piston reciprocally mounted in the combustion cylinder, valve pistons reciprocally mounted in the valve cylinders, a manifold connecting the outer ends of the valve cylinders, and an exhaust manifold connected to the exhaust valve cylinders for receiving exhaust gases from the exhaust passages, said first manifold being connected to the exhaust manifold.

3. In an internal combustion engine, a combustion cylinder, an intake valve cylinder, an exhaust valve cylinder, a crank case for supporting all of the cylinders; said valve cylinders being arranged adjacent each other and adjacent the combustion cylinder, said valve cylinders being connected by intake and exhaust passages to the combustion cylinder, a working piston reciprocally mounted in the combustion cylinder, valve pistons reciprocally mounted in the valve cylinders, a manifold connecting the outer ends of the valve cylinders, an exhaust manifold connected to the exhaust valve cylinders for receiving exhaust gases from the exhaust passages, breather pipes connected to the crank case of the engine, and conductor means connecting the first manifold and the breather pipes to the exhaust manifold.

4. In an internal combustion engine, combustion cylinders, valve cylinders arranged adjacent the combustion cylinders and connected thereto by passages, working pistons reciprocally mounted in the combustion cylinders, valve pistons reciprocally mounted in the valve cylinders, and manifold means connecting the outer ends of the valve cylinders.

5. In an internal combustion engine, combustion cylinders, valve cylinders arranged adjacent the combustion cylinders and connected thereto by passages, working pistons reciprocally mounted in the combustion cylinders, valve pistons reciprocally mounted in the valve cylinders, the outer ends of the valve pistons being open, and a manifold means connecting the outer ends of the valve cylinders.

6. In an internal combustion engine, combustion cylinders, valve cylinders, arranged adjacent the combustion cylinders and connected thereto by passages, working pistons reciprocally mounted in the combustion cylinders, valve pistons reciprocally mounted in the valve cylinders, an exhaust conductor for exhausting burnt gases from the combustion cylinders, and a manifold means connecting the outer ends of the valve cylinders to the exhaust conductor.

7. In an internal combustion engine, a combustion cylinder, an exhaust conductor for the cylinder, a crank case upon which the cylinder is mounted, a breather pipe extending from the crank case and connected to the exhaust conductor, and cooling means for the cylinder and the breather pipe.

8. In an internal combustion engine, a combustion cylinder, an exhaust conductor for the cylinder, a crank case upon which the cylinder is mounted, a breather pipe extending from the crank case and connected to the exhaust conductor, and a cooling jacket enclosing the combustion cylinder and the breather pipe.

9. In an internal combustion engine, an engine block having combustion cylinders, valve cylinders adjacent the combustion cylinders and a cooling jacket enclosing all of said cylinders, an exhaust conductor for exhausting the burnt gases from the combustion cylinders, a crank case upon which the engine block is mounted, working pistons reciprocally mounted in the combustion cylinders, valve pistons reciprocally mounted in the valve cylinders, breather pipes extending from the crank case through the cooling jacket, and manifold means connected with the outer ends of the valve cylinders and to the breather pipes and exhaust conductor.

HENRI J. HICKEY.